(12) United States Patent
Trautmann et al.

(10) Patent No.: US 10,962,091 B2
(45) Date of Patent: Mar. 30, 2021

(54) TRANSMISSION DEVICE FOR A MOTOR VEHICLE

(71) Applicant: AUDI AG, Ingolstadt (DE)

(72) Inventors: Carsten Trautmann, Wolfsburg (DE); Christian Meixner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/641,340

(22) PCT Filed: Aug. 17, 2018

(86) PCT No.: PCT/EP2018/072358
§ 371 (c)(1),
(2) Date: Feb. 24, 2020

(87) PCT Pub. No.: WO2019/038208
PCT Pub. Date: Feb. 28, 2019

(65) Prior Publication Data
US 2020/0347917 A1 Nov. 5, 2020

(30) Foreign Application Priority Data
Aug. 25, 2017 (DE) .................. 10 2017 214 917.5

(51) Int. Cl.
F16H 3/72 (2006.01)
(52) U.S. Cl.
CPC .................. F16H 3/724 (2013.01)
(58) Field of Classification Search
CPC ....................................... F16H 3/724
See application file for complete search history.

(56) References Cited

FOREIGN PATENT DOCUMENTS

| DE | 102009056366 A1 | 6/2011 |
|----|----|----|
| DE | 102010036240 A1 | 3/2012 |
| DE | 102010053855 A1 | 6/2012 |
| DE | 102012220970 A1 | 5/2014 |

(Continued)

OTHER PUBLICATIONS

Notification of Transmittal of Translation of the International Preliminary Report on Patentability dated Mar. 5, 2020, in connection with corresponding international Application No. PCT/EP2018/072358 (10 pgs.).

(Continued)

Primary Examiner — Derek D Knight
(74) Attorney, Agent, or Firm — Maier & Maier, PLLC

(57) ABSTRACT

A transmission device for a motor vehicle, having an input shaft, which is operatively connectable to a drive device of the motor vehicle, and a first output shaft and a second output shaft, and including a spur gear differential transmission which is designed as a planetary transmission, by which the input shaft is coupled to the first output shaft and the second output shaft, An electric machine arranged coaxially to the input shaft can be coupled by a shifting device to the input shaft and/or an intermediate shaft coupled across the spur gear differential transmission to the first output shaft and the second output shaft. The electric machine is coupled across a transmission gearing to the shifting device. The transmission gearing has at least two planetary gear sets which are coupled to one another and either have identical stationary gear ratios or are within a determined stationary gear range.

10 Claims, 10 Drawing Sheets

(56) References Cited

FOREIGN PATENT DOCUMENTS

| DE | 102013202381 A1 | 8/2014 | |
|---|---|---|---|
| DE | 102013202382 A1 | 8/2014 | |
| DE | 10 2014 015 793 A1 | 4/2016 | |
| DE | 102014016077 A1 | 5/2016 | |
| JP | 2006046495 A | 2/2006 | |
| WO | WO-2014075671 A1 * | 5/2014 | ............ B60L 50/16 |
| WO | 2016066732 A1 | 5/2016 | |

OTHER PUBLICATIONS

Examination Report dated Jan. 24, 2020 in corresponding German application No. 10 2017 214 917.5; 24 pages; Machine translation attached.
International Search Report dated Nov. 16, 2018 and Written Opinion in corresponding International Application No. PCT/EP2018/072358; 20 pages; Machine translation attached.
German Office Action dated May 27, 2020, in connection with corresponding DE Application No. 10 2017 214 917.5 (20 pgs., including machine-generated English translation).

* cited by examiner

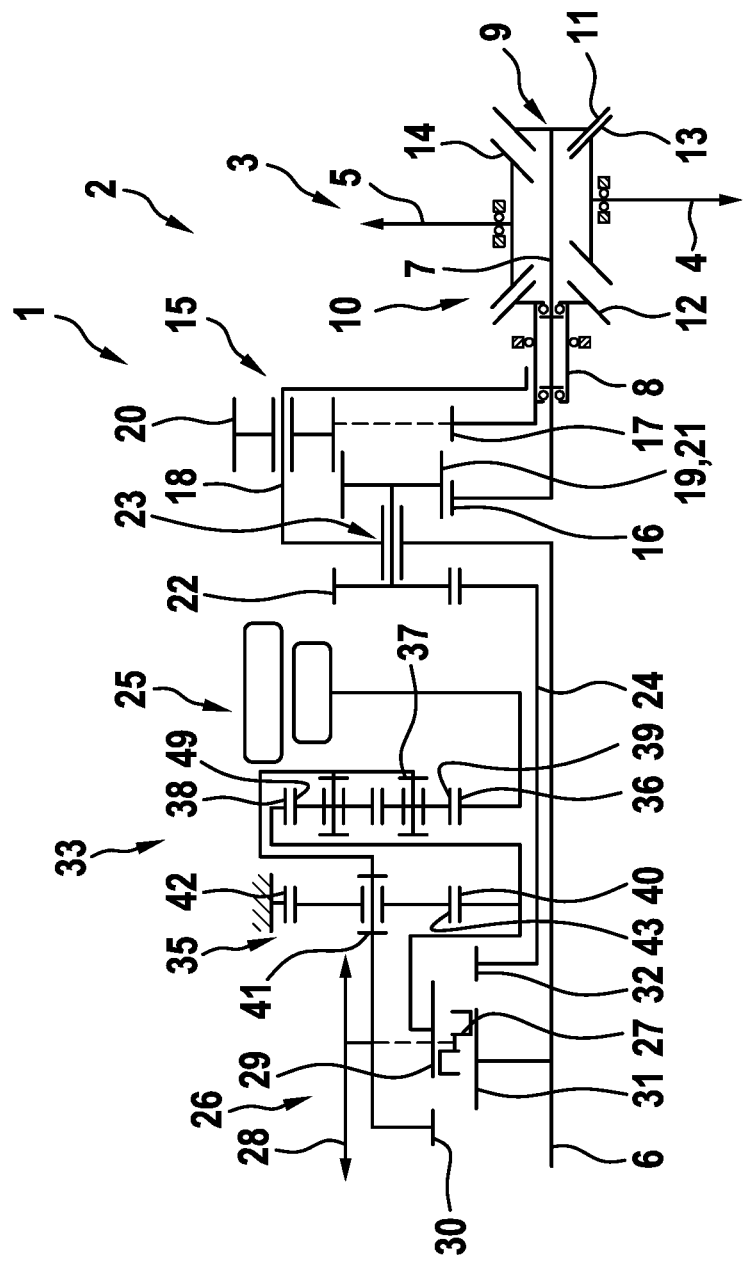

TRANSMISSION DEVICE FOR A MOTOR VEHICLE

FIELD

The disclosure relates to a transmission device for a motor vehicle, having an input shaft, which is operatively connectable to a drive device of the motor vehicle, and a first output shaft and a second output shaft, and comprising a spur gear differential transmission which is designed as a planetary transmission, by means of which the input shaft is coupled to the first output shaft and the second output shaft, wherein an electric machine arranged coaxially to the input shaft can be coupled by means of a shifting device to the input shaft and/or an intermediate shaft coupled across the spur gear differential transmission to the first output shaft and the second output shaft.

The invention relates to a transmission device for a motor vehicle, having an input shaft, which is operatively connectable to a drive device of the motor vehicle, and a first output shaft and a second output shaft, and comprising a spur gear differential transmission which is designed as a planetary transmission, by means of which the input shaft is coupled to the first output shaft and the second output shaft, wherein an electric machine arranged coaxially to the input shaft can be coupled by means of a shifting device to the input shaft and/or an intermediate shaft coupled across the spur gear differential transmission to the first output shaft and the second output shaft.

BACKGROUND

The transmission device serves, for example, for transmitting a torque between a drive device of the motor vehicle on the one hand and a wheel axle of the vehicle, on the other hand. By the transmission device, the wheel axle is operatively connected or at least can be operatively connected to the drive device. The wheel axle accordingly is a driven wheel axle. It may be configured as a front wheel axle or a rear wheel axle of the motor vehicle. The transmission device comprises the input shaft as well as the first output shaft and the second output shaft.

The input shaft of the transmission device is connected to the drive device of the motor vehicle, preferably across a manual transmission and/or a clutch, especially a starter clutch. By means of the manual transmission, one of many gearings can be selected and adjusted between the drive device and the input shaft of the transmission device. The clutch is preferably designed as a shift clutch and especially preferably as a starter clutch. With the aid of the clutch, the operative connection can accordingly be made or broken between the drive device and the input shaft of the transmission device by choice.

The drive device comprises at least one drive unit, which is designed for example as an internal combustion engine or an electric machine. Of course, the drive device may also be a hybrid drive device comprising multiple drive units, which are preferably of different type. In this case, one of the drive units is an internal combustion engine, for example, or another of the drive units is an electric machine. If the drive device comprises multiple drive units, it is preferably configured such that the drive units together provide at least some of the time a driving torque for the driving of the motor vehicle.

The input shaft of the transmission device is coupled across the planetary transmission to both the first output shaft and the second output shaft, especially in permanent manner. The planetary transmission constitutes a spur gear differential transmission, i.e., a differential transmission comprising multiple intermeshing spur gears. Quite generally, the spur gear differential transmission works as a differential transmission or equalizing transmission.

In the prior art, the document WO 2016/066732 A1 is known, for example. This discusses a transmission device for a motor vehicle, comprising an input shaft operatively connectable to a drive unit as well as a first output shaft and a second output shaft, the first output shaft being operatively connected or able to be operatively connected across a first transmission to a first partial shaft of a wheel axle and the second output shaft being so connected across a second transmission to a second partial shaft of the wheel axle.

The problem which the disclosure proposes to solve is to propose a transmission device having advantages over known transmission devices, in particular, one in the electric machine is flexibly integrated in the transmission device.

SUMMARY

This is achieved according to the disclosure with a transmission device. It is provided that the electric machine is coupled across a transmission gearing to the shifting device, wherein the transmission gearing has at least two planetary gear sets which are coupled to one another and which either have identical stationary gear ratios or are within a determined stationary gear range.

Basically, two different embodiments of the transmission device are described in this specification. A first embodiment of the transmission device calls for the input shaft to be coupled by means of the spur gear differential transmission to the first output shaft and the second output shaft, preferably in permanent manner. In this case, the input shaft constitutes the sole input shaft of the spur gear differential transmission.

In a second embodiment of the disclosure, the intermediate shaft is present in addition to the input shaft, so that the input shaft as well as the intermediate shaft are each coupled across the spur gear differential transmission to the first output shaft and the second output shaft, preferably likewise in permanent manner. The intermediate shaft in this case is preferably arranged coaxial to the input shaft, it particular it receives the input shaft at least for a portion.

Both the input shaft and the intermediate shaft are preferably connected solely by the spur gear differential transmission to the two output shafts. This holds regardless of the configuration of the transmission device.

The electric machine can be coupled by means of the shifting device to the input shaft and/or the intermediate shaft. The electric machine serves in particular for realizing a "torque vectoring" functionality. This is the case when it is coupled or can be coupled to the intermediate shaft. Alternatively or additionally, the electric machine is or can be coupled to the input shaft. If the electric machine is coupled to the input shaft, it will serve for providing an additional torque on the input shaft, which is superimposed on the driving torque provided by the drive device. The torque provided by the electric machine may be positive or negative, so that ultimately the electric machine is operated either as an electric motor or as a generator.

The electric machine can be coupled to the input shaft and/or the intermediate shaft by means of the shifting device. Preferably, therefore, the operative connection between the electric machine and the input shaft or the intermediate shaft can be arbitrarily made or broken with the aid of the shifting device. Especially preferably, the shifting device serves for decoupling the electric machine both from the input shaft and the intermediate shaft, for connecting it to the input shaft, or for connecting it to the intermediate shaft, as desired. With such a configuration of the shifting device, an especially flexible use of the electric machine is possible.

A further improvement in the flexibility of the integration of the electric machine is accomplished by the realization of the transmission gearing. By the transmission gearing, the electric machine is coupled to the shifting device, so that in other words the electric machine is attached to the shifting device only indirectly across the transmission gearing. The transmission gearing comprises the two planetary gear sets, which are henceforth denoted as the first planet gear set and the second planet gear set. The two planetary gear sets are outfitted with the same stationary gear ratio, but at least with the identical magnitude of stationary gear ratio. This means that the sign of the stationary gear ratios of the two planetary gear sets may be the same or different. Alternatively, they lie in the same stationary gear range. By this is meant that the stationary gear ratios of the planetary gear sets or their magnitudes stand in a definite relation to each other. For example, the stationary gear ratios lie in a range of at most 10%, at most 20% or at most 25%, with respect to one of the stationary gear ratios.

Each of the planetary gear sets is present as a complete planet gear set and accordingly comprises a sun gear, a planet gear carrier and a ring gear, while at least one planet gear is rotatably mounted on the planet gear carrier. In the case of the first planet gear set, these elements are denoted within this specification sometimes as the first sun gear, the first planet gear carrier, the first ring gear and the first planet gear; in the case of the second planet gear set as the second sun gear, the second planet gear carrier, the second ring gear and the second planet gear. In a first variant, the respective planet gear, i.e., the first planet gear or the second planet gear, meshes with the respective ring gear and with the respective sun gear. In a second variant, the planet gear is designed as an inner planet gear, which meshes with the sun gear, but not with the ring gear. Instead, the inner planet gear meshes with an outer planet gear, which is likewise mounted rotatably on the respective planet gear carrier and meshes with the ring gear, but not with the sun gear.

With the aid of the two planetary gear sets, which have the identical stationary gear ratio or at least lie in the same stationary gear range, an especially compact configuration of the transmission device is achieved. In particular, by providing the two planetary gear sets and the high transmission ratio which can be achieved in this way between the electric machine and the shifting device, a further transmission gearing of the transmission device can be smaller or even eliminated entirely.

Furthermore, the described configuration of the transmission gearing makes possible an attachment of the electric machine to the input shaft and/or the intermediate shaft with different gearings. For example, it may be provided that the transmission gearing provides two different gearings, so that the electric machine can be coupled to the input shaft and/or the intermediate shaft with a first transmission ratio or with a second transmission ratio, different from the latter. This enables a flexible operation of the transmission device.

One preferred embodiment of the disclosure calls for the two planetary gear sets looking in the axial direction with respect to an axis of rotation of the input shaft to be arranged on the same side of the electric machine or on opposite sides of the electric machine. This means that the two planetary gear sets, which are coupled together, are either designed very compact in the axial direction or depending on the design space for the transmission device are arranged separately from each other. In the latter case, they are arranged on opposite sides of the electric machine.

In any case, a connection shaft may be present between the two planetary gear sets, by which they are coupled together. The connection shaft is arranged preferably coaxial to the input shaft and/or the intermediate shaft. Preferably, it accommodates at least the input shaft, further preferably however also the intermediate shaft at least in itself, looking in the axial direction. If the two planetary gear sets are arranged on opposite sides of the electric machine, the connection shaft reaches through the electric machine in the axial direction, in order to couple together the two planetary gear sets.

One especially preferred embodiment of the disclosure calls for the electric machine to be coupled in a first shifting position of the shifting device to the input shaft and in a second shifting position of the shifting device to the intermediate shaft. The shifting device accordingly makes possible the adjusting of at least two shifting positions, namely, the first shifting position and the second shifting position. In the first shifting position, the electric machine is coupled rotationally firmly to the input shaft and in the second shifting position it is in the intermediate shaft. Especially preferably, moreover, a third shifting position is provided, in which the electric machine is decoupled both from the input shaft and the intermediate shaft. This configuration makes possible the above described flexible use of the electric machine.

In one especially preferred embodiment of the disclosure it may be provided that a sun gear of a first of the planetary gear sets is coupled to the electric machine. The sun gear of the first planet gear set should thus be coupled to the electric machine, preferably in rigid and/or permanent manner. Accordingly, the electric machine is coupled to the transmission gearing across the sun gear. Preferably, the electric machine is coupled solely to the sun gear of the first planet gear set, but not to further gearing elements of the planetary gear sets.

A further embodiment of the disclosure calls for a planet gear carrier or a ring gear of the first planet gear set to be coupled to a sun gear of a second of the planetary gear sets. It was already mentioned above that the two planetary gear sets are coupled together, wherein preferably the electric machine is attached directly to the first planet gear set and through this indirectly to the second planet gear set. Finally, the second planet gear set is attached directly to the shifting device, which accordingly is only coupled indirectly across the second planet gear set to the first planet gear set. The coupling between the planetary gear sets is realized by the coupling of the planet gear carrier or the ring gear of the first planet gear on the one hand and the sun gear of the other planet gear set. The coupling is preferably rigid and/or permanent and furthermore direct. This means that, for given speed of rotation of the planet gear carrier or the ring gear, the sun gear will always have the same speed.

One modification of the disclosure calls for a first input gear of the shifting device to be coupled to the planet gear carrier or the ring gear of the first planet gear set and/or to the sun gear of the second planet gear set. Preferably, it is provided that the shifting device comprises the first input gear, a second input gear and at least a first output gear as well as (optionally) a second output gear. A coupling element of the shifting device can now be arranged in different shifting positions and in at least one of the shifting positions it couples at least one of the input gears to at least one of the output gears. For example, the coupling element can move in the axial direction relative to the axis of rotation of the input shaft, namely, at least between the first shifting position and the second shifting position.

Now, the first input gear of the shifting device should be attached either directly to the first planet gear set or directly to the second planet gear set. In the case of the first planet gear set, the first input gear is preferably coupled to the planet gear carrier or the ring gear, in the case of the second planet gear set it is coupled to the sun gear, preferably in rigid and/or permanent manner in each case. This has the advantage that a first gearing can be realized by the first input gear between the electric machine and the input shaft or the intermediate shaft.

Another preferred embodiment of the disclosure calls for a second input gear of the shifting device to be coupled to the planet gear carrier or the ring gear of the second planet gear set. The second input gear is accordingly constantly attached to the second planet gear set, namely, on the planet gear carrier or the ring gear. By the second gear, accordingly, a second gearing can be realized between the electric machine and the input shaft or the intermediate shaft, the second gearing being different from the first gearing. Accordingly, with the embodiment of the transmission device described here, the electric machine can be attached with different gearing to the input shaft or the intermediate shaft, so that the electric machine can be operated with optimal efficiency at many operating points of the drive device or the transmission device.

Another preferred embodiment of the disclosurecalls for a first output gear of the shifting device to be coupled to the input shaft and/or a second output gear of the shifting device to be coupled to the intermediate shaft. The presence of the first output gear and/or the second output gear has already been pointed out. The first output gear is coupled to the input shaft and the second output gear (if present) is coupled to the intermediate shaft, preferably in rigid and/or permanent manner. For example, the respective output gear is rotatably mounted by the corresponding shaft, being arranged on it for this purpose and connected to it in rotationally fixed manner By the first output gear, the coupling element of one of the input gears can be placed in operative connection with the input shaft and by the second output gear in operative connection with the intermediate shaft.

Another embodiment of the disclosure calls for a coupling element of the shifting device to be able to be arranged in at least the first shifting position and the second shifting position and in the first shifting position it meshes with the first input gear and the first output gear and in the second shifting position it meshes with the first input gear and the second output gear. This means that the coupling element in the two shifting positions adjusts the same gearing between the electric machine and the drive shaft on the one hand and between the electric machine and the intermediate shaft on the other hand, by coupling the respective output gear to the first input gear, preferably in rotationally fixed manner.

Finally, in another embodiment of the disclosure, it may be provided that the coupling element in a third shifting position meshes with the second input gear and the first output gear. In the third shifting position, accordingly, the second gearing exists between the electric machine and the input shaft, being different from the first gearing. It may be provided that the shifting device is additionally designed such that the coupling element in a fourth shifting position couples the second input gear to the second output gear.

BRIEF DESCRIPTION OF THE DRAWING

The disclosure shall now be explained more closely below with the aid of the exemplary embodiments presented in the drawing, without this being a limitation of the disclosure. There are shown.

DETAILED DESCRIPTION

Figure 1:
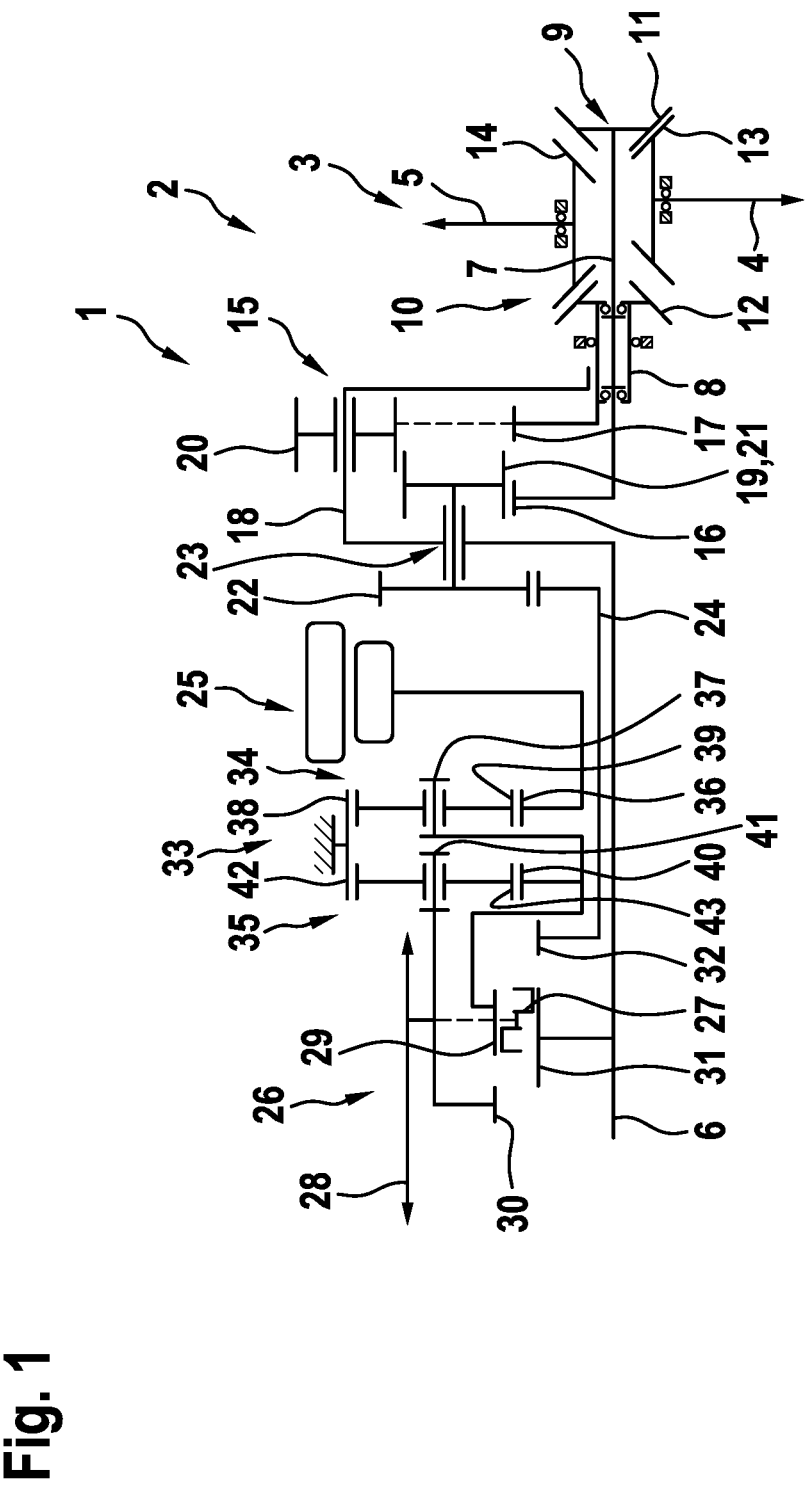
FIG. 1 a schematic representation of a transmission device for a motor vehicle in a first embodiment, FIG. 2 a schematic representation of the transmission device in a second embodiment, FIG. 3 a schematic representation of the transmission device in a third embodiment, FIG. 4 a schematic representation of the transmission device in a fourth embodiment, FIG. 5 a schematic representation of the transmission device in a fifth embodiment, FIG. 6 a schematic representation of the transmission device in a sixth embodiment, FIG. 7 a schematic representation of the transmission device in a seventh embodiment, FIG. 8 a schematic representation of the transmission device in a eighth embodiment, FIG. 9 a schematic representation of the transmission device in a ninth embodiment, and FIG. 10 a schematic representation of the transmission device in a tenth embodiment.

FIG. 1 shows a schematic representation of a first embodiment of a transmission device 1, which is provided here for example as part of a motor vehicle 2 not shown in detail. The motor vehicle 2 has a wheel axle 3 with a first partial shaft 4 and a second partial shaft 5. The wheel axle 3 or the partial shafts 4 and 5 can be driven across the transmission device 1 by means of a drive device of the motor vehicle 2. The drive device is or at least can be operatively connected to an input shaft 6 of the transmission device 1. The first partial shaft 4, on the other hand, is connected to a first output shaft 7, and the second partial shaft 5 to a second output shaft 8 of the transmission device 1, or they are operatively connected to the respective output shaft 7 or 8.

The operative connection between the first partial shaft 4 and the first output shaft 7 is produced by a first transmission 9, the operative connection between the second partial shaft 5 and the second output shaft 8 by a second transmission 10. The transmissions 9 and 10 may be in the form of angle gear transmissions. Preferably, they are designed as a bevel gear transmission and accordingly they each possess a first bevel gear 11 or 12 and a second bevel gear 13 or 14. According to the present embodiment of the transmission device 1 here, it may be provided that the partial shafts 4 and 5 or their axes of rotation in the lateral or radial direction are offset from each other relative to the axes of rotation. However, alternatively, the partial shafts 4 and 5 may also be arranged coaxial to each other, i.e., aligned with each other at least in a top view.

The output shafts 7 and 8 may be angled relative to the partial shafts 4 and 5 or the wheel axle 3, i.e., making with it an angle of more than 0° and less than 180°, such as an angle of 90°. The corresponding deflection is realized with the aid of the transmissions 9 and 10, which are in the form of angle transmissions. Of course, alternatively, the transmissions 9 and 10 may be designed as spur gear transmissions. For example, the output shafts 7 and 8 in this case are arranged parallel to the partial shafts 4 and 5.

The transmission device 1 comprises a spur gear differential transmission 15, by which the first output shaft 7 and the second output shaft 8 are operatively connected or coupled permanently to the input shaft 6. For this purpose, the spur gear differential transmission 15 is designed as a planetary transmission, having a first sun gear 16, a second sun gear 17 and a planet gear carrier 18, on which a first planet gear 19 and a second planet gear 20 are rotatably mounted. The planet gear carrier 18 is coupled to the input shaft 6 of the transmission device 1, especially in rigid and/or permanent manner.

The first sun gear 16, on the other hand, is coupled to the first output shaft 7, and the second sun gear 17 is coupled to the second output shaft 8, preferably in rigid and/or permanent manner. The first planet gear 19 meshes with the second planet gear 20, preferably in permanent manner. The first planet gear 19 furthermore meshes with the first sun gear 16, but not with the second sun gear 17. The second planet gear 20, on the other hand, meshes with the second sun gear 17, but not with the first sun gear 16.

The first planet gear 19 is designed as a first stepped planetary gear 21, which is coupled rotationally firmly to a second stepped planetary gear 22. The two stepped planetary gears 21 and 22 are together mounted rotatably on the planet gear carrier 18, being present preferably on opposite sides of a bearing location 23 on the planet gear carrier 18. The second stepped planetary gear 22 is rotationally firmly coupled to an intermediate shaft 24, especially in rigid and/or permanent manner. It can clearly be seen that the two output shafts 7 and 8 as well as the input shaft 6 and the intermediate shaft 24 are arranged coaxial to each other, i.e., they have the same axis of rotation. The second output shaft 8 here accommodates the first output shaft 7 at least for a portion, and likewise the intermediate shaft 24 accommodates the input shaft 6 at least for a portion. It should further be pointed out in particular that the spur gear differential transmission 15 is a design without ring gear, i.e., it has no ring gear.

The transmission device 1 comprises an electric machine 25, which can be coupled by a shifting device 26 to the input shaft 6 and/or the intermediate shaft 24. The shifting device 26 comprises a coupling element 27, which can move according to the double arrow 28 in the axial direction. In the embodiment represented here, the shifting device 26 comprises a first input gear 29, a second input gear 30, a first output gear 31 and a second output gear 32.

The coupling element 27, now, is configured such that it meshes with different gears 29, 30, 31 and 32 in different positions. For example, in a first shifting position the coupling element 27 meshes with the first input gear 29 and the first output gear 31. In a second position, for example, it meshes with the first input gear 29 and the second output gear 32. In a third shifting position, on the other hand, it may be provided that it meshes with the second input gear 30 and the first output gear 31. The two input gears 29 and 30 are coupled to the electric machine 25, preferably in rigid and/or permanent manner. The first output gear 31 is firmly coupled to the input shaft 6 and the second output gear 32 firmly to the intermediate shaft 24, likewise preferably in rigid and/or permanent manner.

The connection between the electric machine 25 and the shifting device 26 is via a transmission gearing 33. This comprises a first planet gear set 34 and a second planet gear set 35, the two planetary gear sets 34 and 35 being coupled together. The first planet gear set 34 comprises a sun gear 36, a planet gear carrier 37 and a ring gear 38, there being at least one planet gear 39 rotatably mounted on the planet gear carrier 37. The planet gear 39 meshes with both the sun gear 36 and with the ring gear 38.

Similarly, the second planet gear set 35 comprises a sun gear 40, a planet gear carrier 41 and a ring gear 42, one planet gear 42 being rotatably mounted on the planet gear carrier 41 and meshing with the sun gear 40 and the ring gear 42. The two ring gears 38 and 42 are designed as a common ring gear and are fixed, for example with respect to a first transmission housing of the transmission device, in the exemplary embodiment shown here.

The two input gears 29 and 30 are coupled respectively by one of the planetary gear sets 34 and 35 to the electric machine 25, preferably in rigid and/or permanent manner. In the exemplary embodiment shown here, the electric machine 25 is coupled to the sun gear 36 of the first planet gear set 34. The planet gear carrier 37 of the first planet gear set 34 is coupled to the sun gear 40 of the second planet gear set 35 and the first input gear 29. The planet gear carrier 41 of the second planet gear set 35, on the other hand, is coupled to the second input gear 30.

Figure 2:
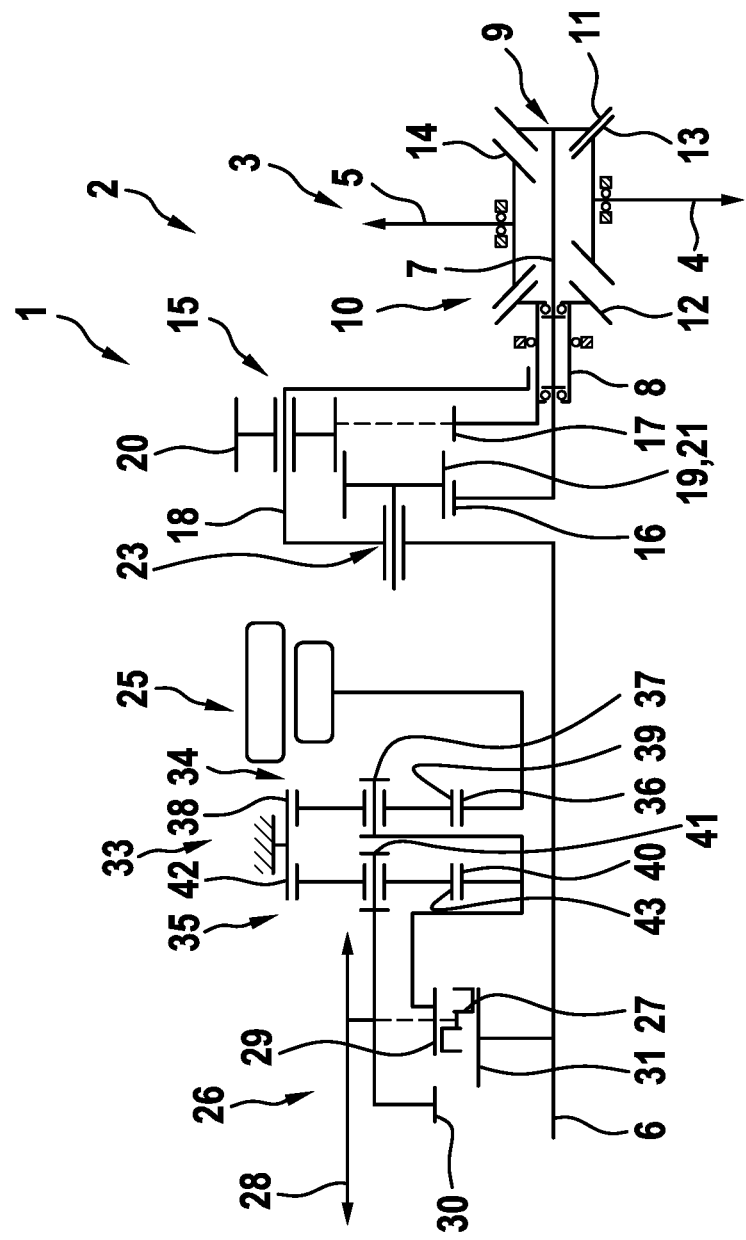

FIG. 2 shows a schematic representation of a second exemplary embodiment of the transmission device 1. This resembles the first embodiment, so that reference is made to the corresponding remarks and only the differences shall be taken up below. These lie in the fact that the intermediate shaft 24 is lacking and accordingly neither is the second output gear 32 present. The same holds for the second stepped planet gear 22.

Figure 3:
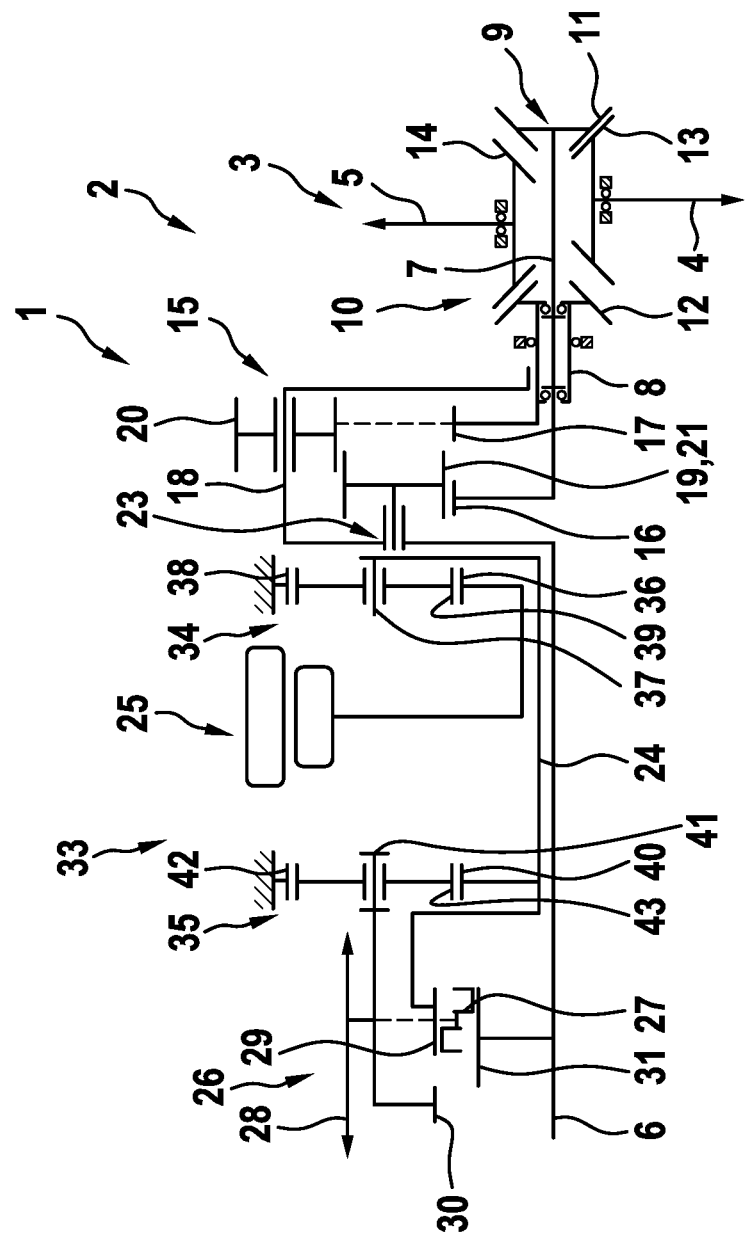

FIG. 3 shows a third exemplary embodiment of the transmission device 1 in schematic representation. This resembles the second embodiment, so that reference is made to the corresponding remarks. The difference from the second embodiment lies in that fact that the two planetary gear sets 34 and 35 looking in the axial direction with respect to the axis of rotation of the input shaft 6 are situated on opposite sides of the electric machine 25. Accordingly—once again looking in the axial direction—the first planet gear set 34 is arranged between the spur gear differential transmission 15 and the electric machine 25, whereas the second planet gear set 35 is present between the electric machine 25 and the shifting device 26.

Figure 4:
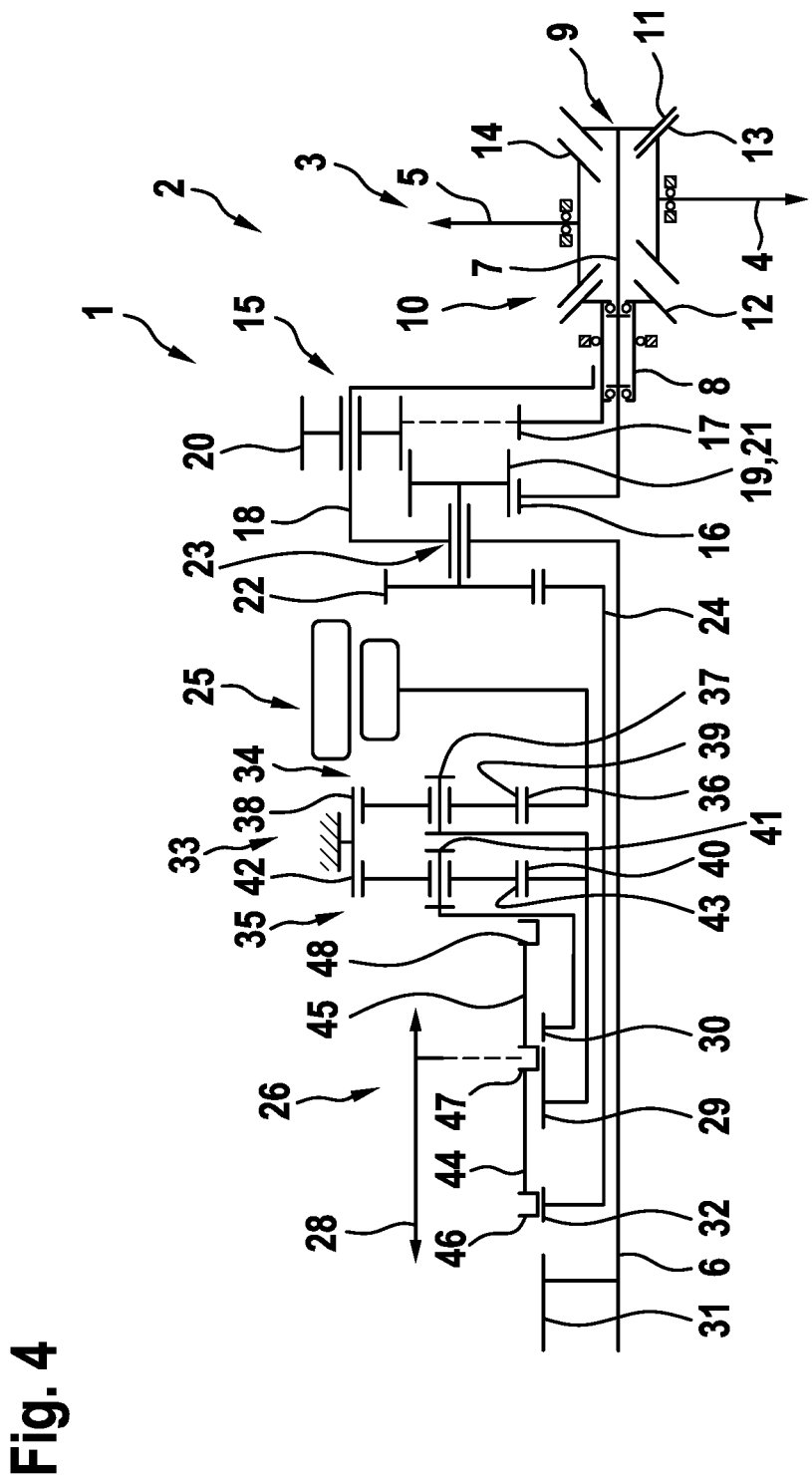

FIG. 4 shows a fourth embodiment of the transmission device 1. This resembles the first embodiment, so that reference is made to the corresponding remarks and only the differences shall be pointed out below. These lie in the design of the shifting device 26, especially the coupling element 27. It becomes clear that the two input gears 29 and 30 as well as the two output gears 31 and 32 are each designed as spur gears. The coupling element 27 comprises three engaging elements 46, 47 and 48 joined together by push rods 44 and 45, being spaced apart from each other in the axial direction. Once again, the coupling element 27 is designed such that different shifting combinations between the input gears 29 and 30 on the one hand and the output gears 31 and 32 are produced in different shifting positions.

Figure 5:
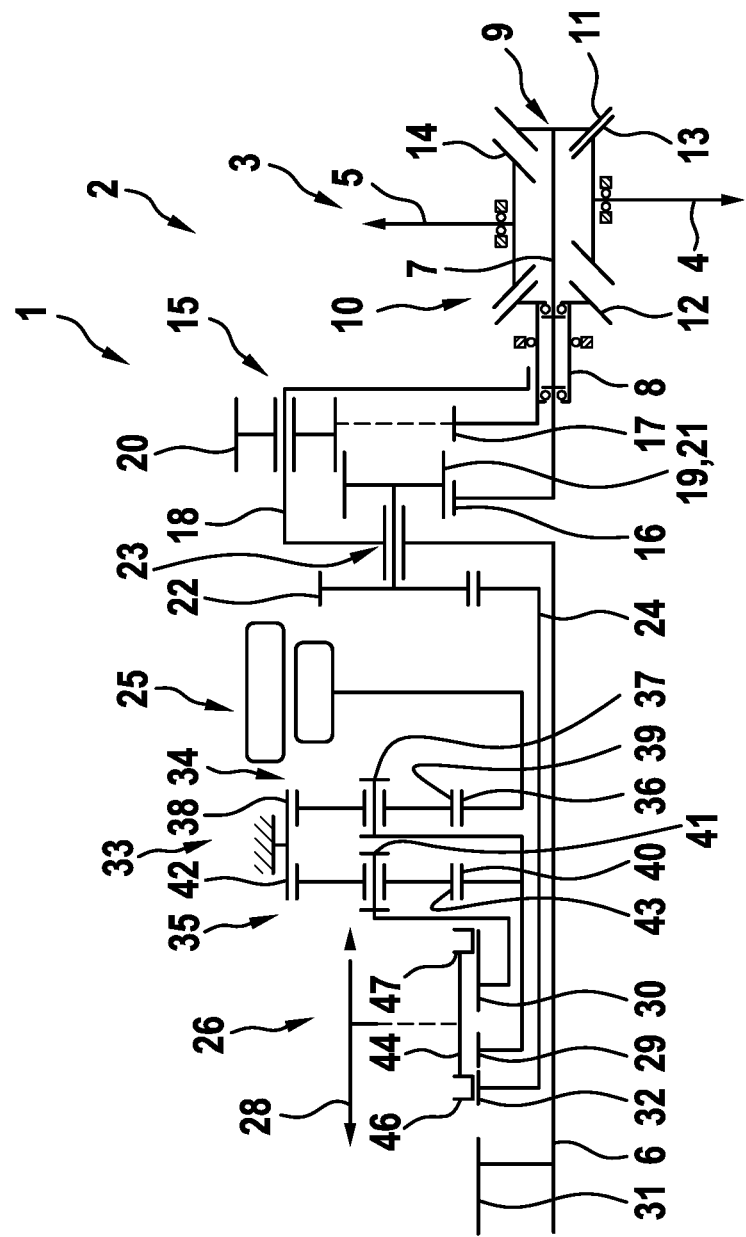

FIG. 5 shows a fifth exemplary embodiment of the transmission device 1. This resembles the fourth embodiment, so that reference is made to the corresponding remarks. The differences from the fourth embodiment lie in the design of the coupling element 27, which here comprises only the engaging elements 46 and 47, which are joined together by the push rod 44. Accordingly, the push rod 45 and the engaging element 48 are missing as compared to the fourth embodiment. The fifth embodiment differs from the fourth embodiment in terms of the possible shifting combinations between the input gears 29 and 30 on the one hand and the output gears 31 and 32 on the other hand.

Figure 6:
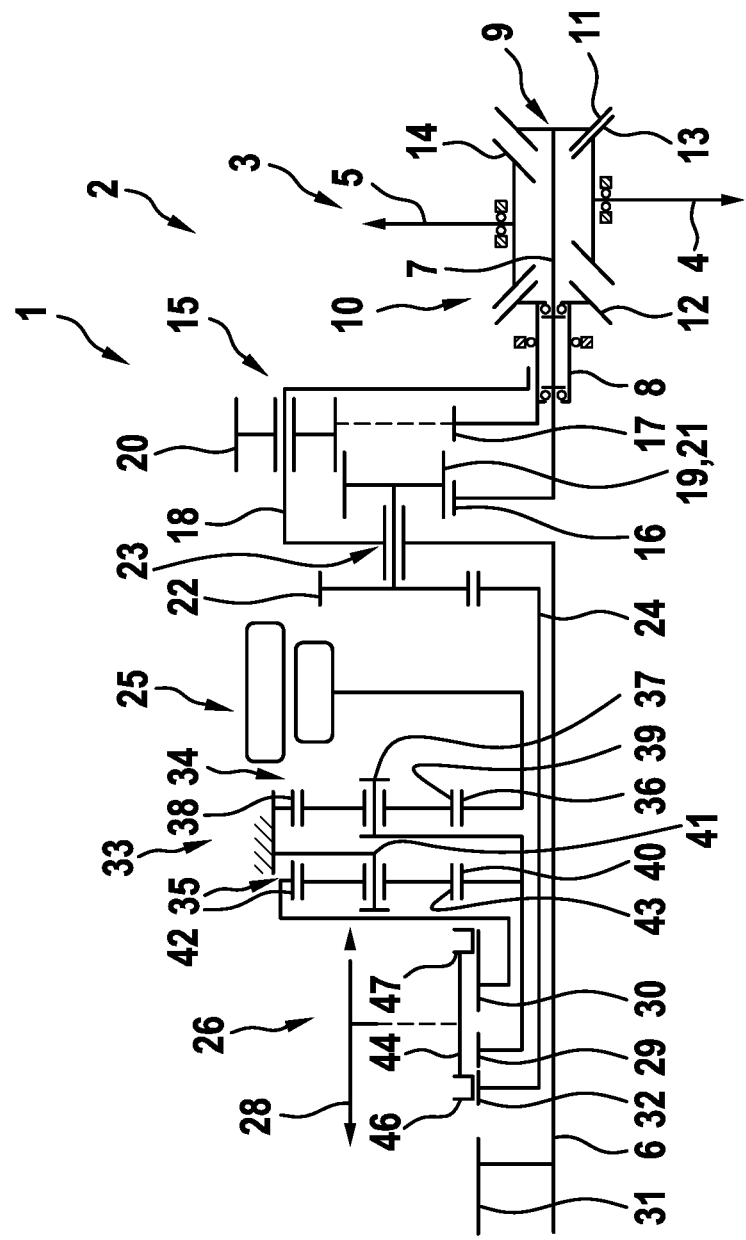

FIG. 6 shows a sixth embodiment of the transmission device 1. This resembles the fifth embodiment, so that reference is made to the corresponding remarks. The differences lie in the design of the transmission gearing 33. Thus, it is now provided that the second input gear 30 is coupled to the ring gear 42 of the second planet gear set 35. This is rotatable, i.e., not fixed, by contrast with the above described embodiments. On the other hand, the planet gear carrier 41 of the second planet gear set 35 is fixed, for example, in relation to the housing of the transmission device 1. With such an embodiment, a different gearing ratio can be realized for the second input gear 30.

Figure 7:
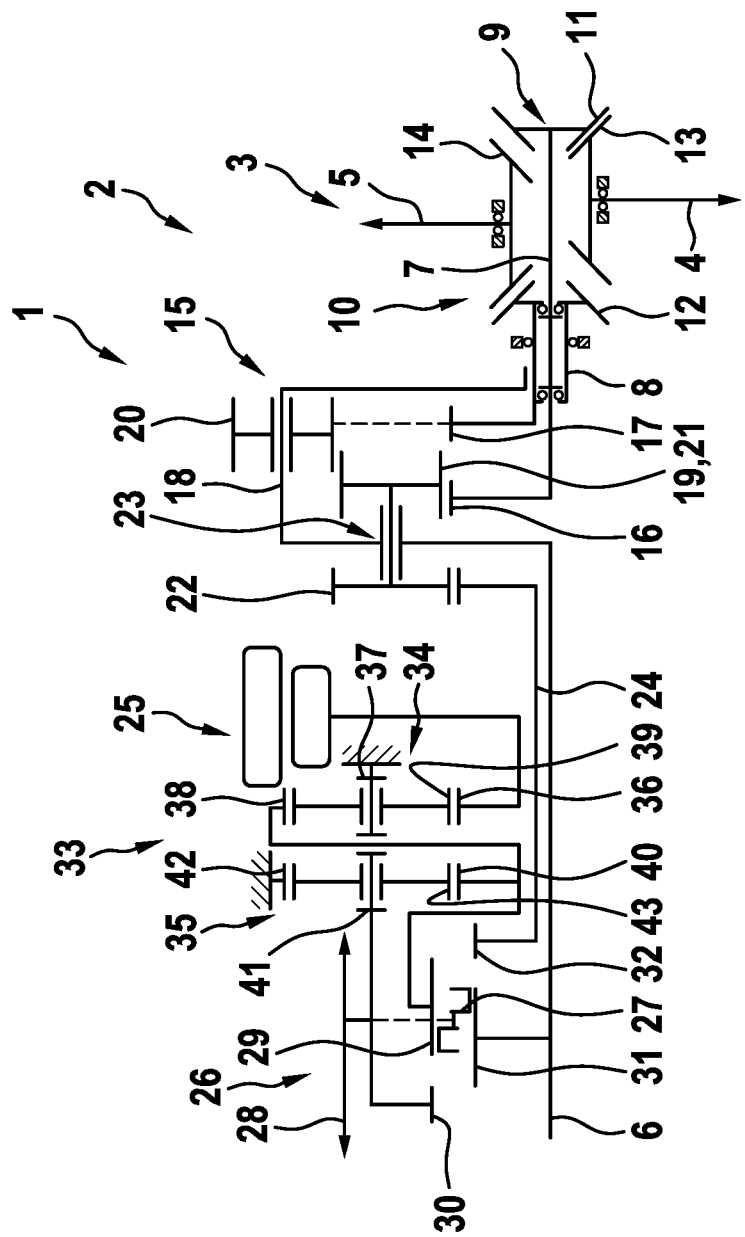

FIG. 7 shows a seventh embodiment of the transmission device 1. This resembles the first embodiment, so that reference is made to the corresponding remarks and only the differences shall be discussed below. These lie in the fact that the ring gear 38 of the first planet gear set 34 is rotatable and coupled to the sun gear of the second planet gear set 35, preferably in rigid and/or permanent manner. On the contrary, the planet gear carrier 37 of the first planet gear set 34 is fixed, for example relative to the housing of the transmission device 1.

Figure 8:
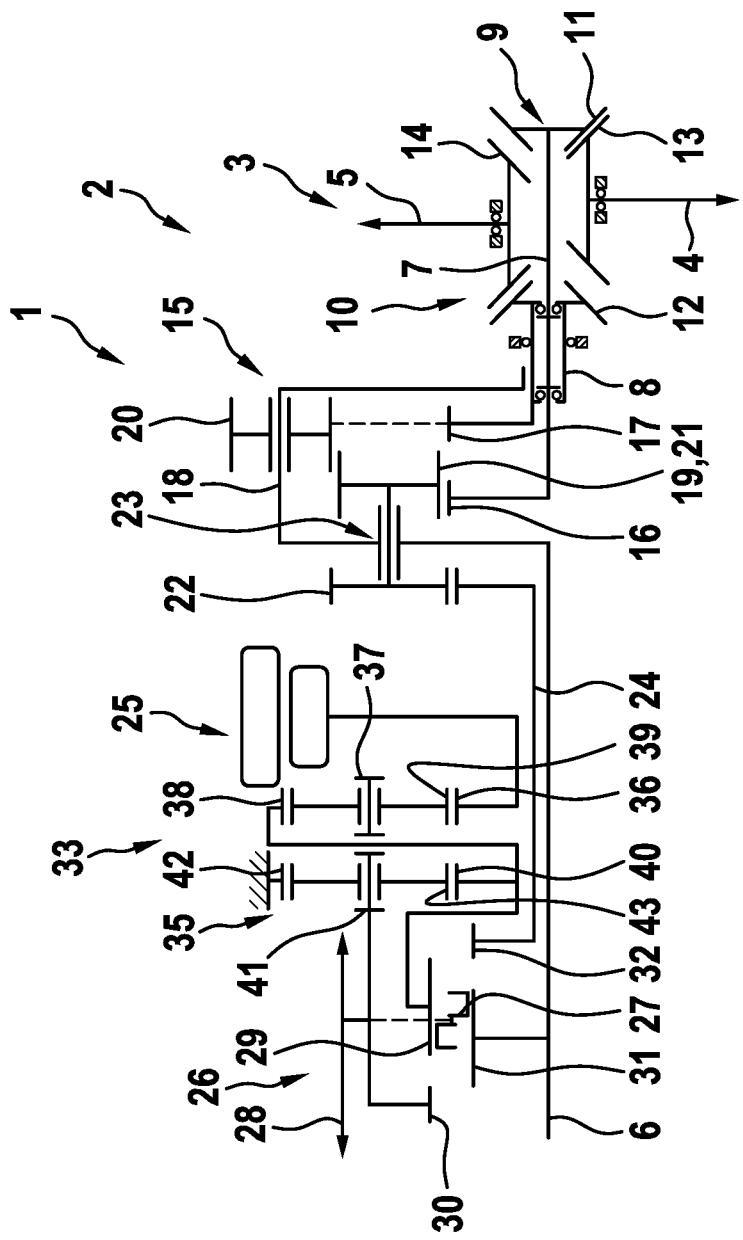

FIG. 8 shows an eighth embodiment of the transmission device 1. Once again, reference is made to the remarks for the first embodiment and only the differences shall be pointed out below. Similar to the seventh embodiment, in the eighth embodiment the ring gear 38 of the first planet gear set 34 is rotatably mounted. It is coupled to the planet gear carrier 41 of the second planet gear set 35, especially in rigid and/or permanent manner. This means that it is coupled at the same time to the second input gear 30.

Figure 9:
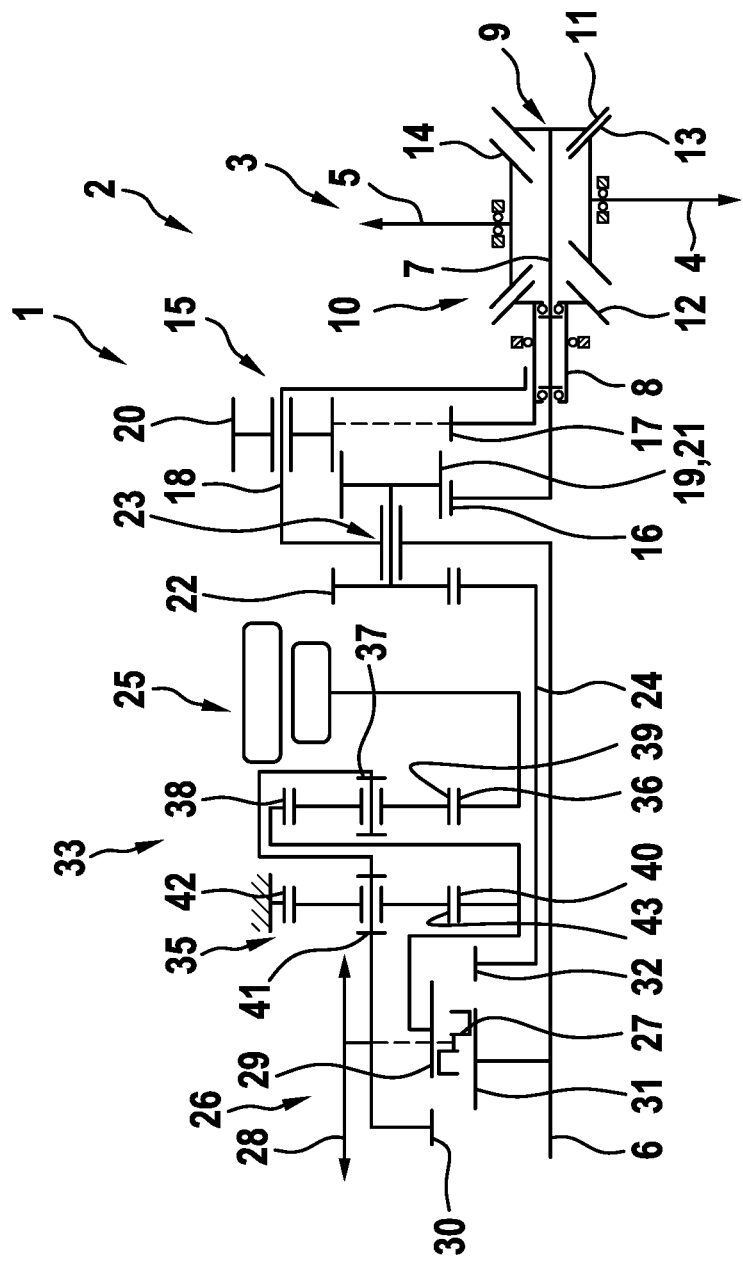

FIG. 9 shows a ninth embodiment of the transmission device 1. Reference is made to the remarks for the first embodiment and only the differences shall be pointed out below. Once again, the ring gear 38 of the first planet gear set 34 is rotatably mounted. It is coupled to the sun gear 40 of the second planet gear set 35, preferably in rigid and/or permanent manner Similar to the first embodiment, this sun gear 40 is coupled to the first input gear 29. The coupling of the two planetary gear sets 34 and 35 is realized by a coupling of the planet gear carriers 37 and 41, the coupling being preferably rigid and/or permanent. Furthermore, it is provided that the planet gear carrier 41 is coupled to the second input gear 30.

FIG. 10 shows a tenth embodiment of the transmission device 1. Once again, reference is made to the remarks for the first embodiment and only the differences shall be pointed out. It can be seen that the planet gear 39 of the first planet gear set 34 is designed as an inner planet gear. In addition to the inner planet gear 39, the first planet gear set 34 comprises an outer planet gear. The inner planet gear 39 meshes with the sun gear 36 of the first planet gear set 34, but not with the ring gear 38.

The outer planet gear 49 meshes with the inner planet gear 39 and with the ring gear 38, but not with the sun gear 36. Both the inner planet gear 39 and the outer planet gear 49 are rotatably mounted on the planet gear carrier 37 of the first planet gear set 34. Similar to the ninth embodiment, the planet gear carrier 37 of the first planet gear set 34 is coupled to the planet gear carrier 41 of the second planet gear set 35, which in turn is coupled to the second input gear 30.

The described transmission device 1 has the advantage, in particular, that the spur gear differential transmission 15 is designed with no ring gear and accordingly can be realized with slight axial design space. Furthermore, the shifting device 26 makes possible a flexible attachment of the electric machine 25, either for driving the input shaft 6 or for providing the "torque vectoring" functionality by driving the intermediate shaft 24.

The invention claimed is:

1. A transmission device for a motor vehicle, comprising:
   an input shaft, which is operatively connectable to a drive device of the motor vehicle,
   a first output shaft,
   a second output shaft, and
   a spur gear differential transmission which is designed as a planetary transmission, by which the input shaft is coupled to the first output shaft and the second output shaft,
   wherein an electric machine arranged coaxially to the input shaft can be coupled by a shifting device to the input shaft and/or an intermediate shaft coupled across the spur gear differential transmission to the first output shaft and the second output shaft,
   wherein the electric machine is coupled across a transmission gearing to the shifting device,
   wherein the transmission gearing has at least two planetary gear sets which are coupled to one another and which either have identical stationary gear ratios or are within a determined stationary gear range,
   wherein the electric machine is coupled in a first shifting position of the shifting device to the input shaft and in a second shifting position of the shifting device to the intermediate shaft.

2. The transmission device according to claim 1, wherein the two planetary gear sets as viewed in the axial direction with respect to an axis of rotation of the input shaft are arranged on the same side of the electric machine or on opposite sides of the electric machine.

3. The transmission device according to claim 1, wherein a sun gear of a first of the planetary gear sets is coupled to the electric machine.

4. The transmission device according to claim 1, wherein a planet gear carrier or a ring gear of a first of the planetary gear sets is coupled to a sun gear of a second of the planetary gear sets.

5. The transmission device according to claim 1, wherein a first input gear of the shifting device is coupled to a planet gear carrier or a ring gear of a first planetary gear set or to a sun gear of a second planetary gear set.

6. The transmission device according to claim 1, wherein a second input gear of the shifting device is coupled to a planet gear carrier or a ring gear of a second planetary gear set.

7. The transmission device according to claim 1, wherein a first output gear of the shifting device is coupled to the input shaft and/or a second output gear of the shifting device is coupled to the intermediate shaft.

8. The transmission device according to claim 1, wherein a coupling element of the shifting device can be arranged in at least a first shifting position and a second shifting position,
   wherein in the first shifting position the coupling element meshes with a first input gear and a first output gear and in the second shifting position the coupling element meshes with the first input gear and a second output gear.

9. The transmission device according to claim 8, wherein the coupling element in a third shifting position meshes with a second input gear and the first output gear.

10. A transmission device for a motor vehicle, comprising:
- an input shaft, which is operatively connectable to a drive device of the motor vehicle,
- a first output shaft,
- a second output shaft, and
- a spur gear differential transmission which is designed as a planetary transmission, by which the input shaft is coupled to the first output shaft and the second output shaft,
- wherein an electric machine arranged coaxially to the input shaft can be coupled by a shifting device to the input shaft and/or an intermediate shaft coupled across the spur gear differential transmission to the first output shaft and the second output shaft,
- wherein the electric machine is coupled across a transmission gearing to the shifting device,
- wherein the transmission gearing has at least two planetary gear sets which are coupled to one another and which either have identical stationary gear ratios or are within a determined stationary gear range,
- wherein a coupling element of the shifting device can be arranged in at least a first shifting position, a second shifting position, and a third shifting position,
- wherein in the first shifting position, the coupling element meshes with a first input gear and a first output gear, in the second shifting position, the coupling element meshes with the first input gear and a second output gear, and in the third shifting position, the coupling element meshes with the first input gear and the second output gear.

* * * * *